(12) United States Patent  
Chuang

(10) Patent No.: US 7,987,606 B2  
(45) Date of Patent: Aug. 2, 2011

(54) SYSTEM FOR TESTING ACCURACY OF ELECTRONIC COMPASS

(75) Inventor: Tsung-Jen Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 195 days.

(21) Appl. No.: 12/534,882

(22) Filed: Aug. 4, 2009

(65) Prior Publication Data

US 2010/0236084 A1   Sep. 23, 2010

(30) Foreign Application Priority Data

Mar. 21, 2009   (CN) .......................... 2009 1 0301020

(51) Int. Cl.  
*G01C 17/38* (2006.01)
(52) U.S. Cl. .................. 33/356; 33/358; 33/362; 702/92
(58) Field of Classification Search ................ 33/355 R, 33/356, 361, 362, 357–359; 73/1.76  
See application file for complete search history.

(56) References Cited

U.S. PATENT DOCUMENTS

| | | | | |
|---|---|---|---|---|
| 4,232,451 A * | 11/1980 | Thomsen | .......................... | 33/361 |
| 5,095,630 A * | 3/1992 | Nomura et al. | .................. | 33/356 |
| 5,440,484 A * | 8/1995 | Kao | .............................. | 701/207 |
| 7,895,759 B2 * | 3/2011 | Hu | .................................. | 33/361 |

* cited by examiner

*Primary Examiner* — Amy Cohen Johnson  
(74) *Attorney, Agent, or Firm* — Frank R. Niranjan

(57) ABSTRACT

A system for testing the accuracy of an electronic compass is disclosed. The system includes a circular track, a compass seat, an electromagnetic element, a driver, a power source, a calculator, and a magnetic shielding chamber. The electromagnetic element is disposed on the circular track and powered by the power source to generate a magnetic field. The electronic compass is installed on the compass seat and surrounded by the circular track. As such, the electronic compass can measure the magnetic field of the electromagnetic element and calculate direction relative to the electromagnetic element at different points of the circular track when the electromagnetic element is driven by the driver to move along the circular track. The magnetic shielding chamber is for shielding the electromagnetic element and the electronic compass from interference of external magnetic fields.

13 Claims, 1 Drawing Sheet

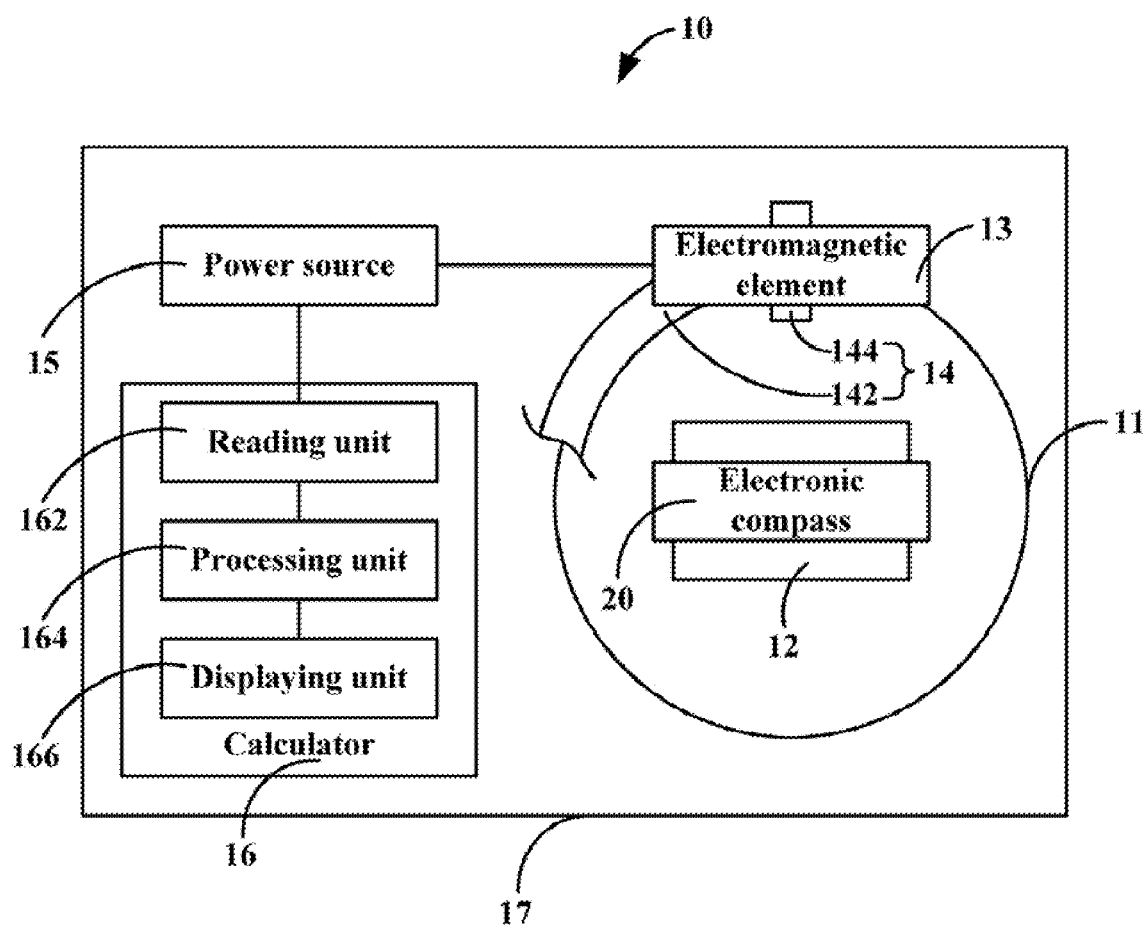

SYSTEM FOR TESTING ACCURACY OF ELECTRONIC COMPASS

BACKGROUND

1. Technical Field

The present disclosure relates to compasses, and particularly to a system for testing the accuracy of an electronic compass.

2. Description of Related Art

Electronic compasses can measure the Earth's magnetic fields and calculate directions based upon the measurement. As such, electronic compasses are widely used in electronic devices. However, it is required to test the accuracy of an electronic compass to ensure reliable navigation. Conventionally, in such a test, the electronic compass is fixed in a vicinity of an electromagnetic element. The electromagnetic element generates magnetic fields to simulate the Earth's magnetic fields. The electronic compass measures the magnetic fields and calculates direction relative to the magnetic fields. Then, the measurement and calculation are compared with ideal values to determine the accuracy of the electronic compass. However, such a test is not adequate to completely determine the accuracy of the electronic compass because the measurement and the calculation are only carried out at one reference point with respect to the magnetic fields.

Therefore, it is desirable to provide a system for testing the accuracy of an electronic compass which can overcome the above-mentioned problems.

BRIEF DESCRIPTION OF THE DRAWINGS

The FIGURE is a block diagram of a system for testing accuracy of an electronic compass, according to an exemplary embodiment.

DETAILED DESCRIPTION

Referring to the FIGURE, a system 10 for testing the accuracy of an electronic compass 20 is illustrated. The system 10 includes a circular track 11, a compass seat 12, an electromagnetic element 13, a driver 14, a power source 15, a calculator 16, and a magnetic shielding chamber 17. The electronic compass 20 can measure a magnetic field and compute a direction relative to the magnetic field based upon the measurement.

The circular track 11, the compass seat 12, the electronic element 13, and the driver 14 are received in the magnetic shielding chamber 17. The compass seat 12 is positioned on the center of the circular track 11. However, in other alternative embodiments, the compass seat 12 can be positioned on other positions within the circular track 11. The electronic compass 20 is installed on the compass seat 12. The electromagnetic element 13, such as a winding coil, is movably disposed on the circular track 11. The driver 14 is configured for moving the compass element 14 along the circular track 11. In detail, the driver 14 can be a piezoelectric step motor having a stator 142 and a moving part 144. The stator 142 is belt-shaped and is looped around the circular track 11. The moving seat 144 is movably disposed on the stator 142. The electromagnetic element 13 is fixed to the moving seat 144. As such, the driver 14 can drive the electromagnetic element 13 to move along the circular track 11 incrementally (i.e., step by step). The electronic compass 20 measures a magnetic field and calculates a direction with respect to the magnetic field and outputs a magnetic intensity and a directional result at each increment. This feature allows the system 10 to test the accuracy of the electronic compass 20 at different reference points relative to the magnetic field.

The power source 15 is received in the magnetic shielding chamber 17 too. However, it should be mentioned that, in other alternative embodiments, the power source 15 can also be positioned outside the magnetic shielding chamber 17. The power source 15 is for supplying power for the electromagnetic element 13 and the driver 14. In this embodiment, the power source 15 can supply different levels of power to the electromagnetic element 13 at different increment. That is, at each increment, the power source 15 provides a unique level of power. As a result, at each increment, the magnetic intensity generated by the electromagnetic element 13 is unique. Accordingly, the electronic compass 20 measures different magnetic densities when the electromagnetic element 13 travelling around the circular track 11. This feature allows the system 10 to test accuracy of measurement of the electronic compass 20.

In this embodiment, the electromagnetic element 13 is fixed to the moving seat 144 so that, when powered by the power source 15 and driven by the driver 14 to move along the circular track 11, one of two magnetic poles of the electromagnetic element 13 remains pointing to the center of the circular track 11, i.e., the electronic compass 20 (this is why positioning the compass seat 12 on the center of the circular track 11 is advantageous).

The calculator 16 is configured for reading the magnetic densities and the directional results from the electronic compass 20 and comparing the measurements and the calculations with ideal values to determine the accuracy of the electronic compass 20. In this embodiment, the calculator 16 includes a reading unit 162, a processing unit 164, and a displaying unit 166. The reading unit 162 is for reading the magnetic densities and the directional results. The processing unit 164 stores the ideal values and is configured for comparing the magnetic densities and the directional results with the ideal values. The displaying unit 166, such as a liquid crystal display (LCD), is for displaying the accuracy of the electronic compass 20.

The magnetic shielding chamber 17 is made from magnetic shielding materials, e.g., aluminium, and can shield components accommodated in the magnetic shielding chamber 17, such as the circular track 11, the electronic element 12, the driver 14, the power source 15, and the calculator 16, from interference of external magnetic fields.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A system for testing accuracy of an electronic compass, the system comprising:
   a circular track;
   a compass seat surrounded by the circular track, the electronic compass being installed on the compass seat;
   an electromagnetic element movably disposed on the circular track;
   a driver configured for driving the electromagnetic element to move along the circular track;
   a power source for powering the electromagnetic element so that the electromagnetic element generates a magnetic field, the electronic compass measuring the magnetic field and calculating direction relative to the magnetic field at a plurality of points of the circular track when driven to move along the circular track and outputting a plurality of magnetic densities and a plurality of directional results, each of which is associated with a corresponding point of the circular track;

a calculator configured for comparing the magnetic densities and the directional results with a plurality of ideal values to determine the accuracy of the electronic compass; and a magnetic shielding chamber for shielding the electromagnetic element and the electronic compass from interference of external magnetic fields.

2. The system of claim 1, wherein the compass seat is positioned on the center of the circular track.

3. The system of claim 2, wherein the electromagnetic element comprises two magnetic poles when powered by the power source, one of the two magnetic poles remaining pointing to the center of the circular track when driven to move along the circular track.

4. The system of claim 1, wherein the electromagnetic element is a winding coil.

5. The system of claim 1, wherein the driver is a step motor.

6. The system of claim 1, wherein the driver comprises a stator and a moving seat, the stator being belt-shaped and looping around the circular track, the moving seat being disposed on the stator, the electromagnetic element being fixed to the moving seat.

7. The system of claim 1, wherein the driver is configured for moving the electromagnetic element to move incrementally, the electronic compass measuring the magnetic field and calculating direction relative to the magnetic field and outputting a magnetic density and a corresponding directional result at each increment.

8. The system of claim 1, wherein the power source is configured for supplying different levels of power to the electromagnetic element.

9. The system of claim 1, wherein the driver is configured for driving the electromagnetic element to move incrementally, the power source being configured for supplying unique levels of power at each increment.

10. The system of claim 1, wherein the calculator comprises:

a reading unit configured for reading the magnetic densities and the directional results;

a processing unit configured for storing the ideal values and comparing the magnetic densities and the directional results with the ideal values; and a displaying unit configured for displaying the accuracy of the electronic compass.

11. The system of claim 10, wherein the displaying unit comprises a liquid crystal display.

12. The system of claim 1, wherein the magnetic shielding chamber is configured for shielding the circular track, the compass seat, the driver, the power source, and the calculator from interference of the external magnetic fields.

13. The system of claim 1, wherein the magnetic shielding chamber is made of aluminum.

\* \* \* \* \*